US010718875B2

(12) United States Patent
Chen

(10) Patent No.: US 10,718,875 B2
(45) Date of Patent: Jul. 21, 2020

(54) OMNIDIRECTIONAL VECTOR ELECTROSTATIC LEVITATION GEOPHONE

(71) Applicant: PetroChina Company Limited, Beijing (CN)

(72) Inventor: Likang Chen, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 281 days.

(21) Appl. No.: 15/965,379

(22) Filed: Apr. 27, 2018

(65) Prior Publication Data

US 2018/0267184 A1  Sep. 20, 2018

Related U.S. Application Data

(63) Continuation of application No. PCT/CN2016/099826, filed on Sep. 23, 2016.

(30) Foreign Application Priority Data

Oct. 28, 2015  (CN) .......................... 2015 1 0711111

(51) Int. Cl.
 *G01V 1/16*  (2006.01)
 *G01V 1/18*  (2006.01)
(52) U.S. Cl.
 CPC ................ *G01V 1/184* (2013.01); *G01V 1/18* (2013.01)
(58) Field of Classification Search
 None
 See application file for complete search history.

(56) References Cited

U.S. PATENT DOCUMENTS 3,745,575 A * 7/1973 Kikuchi ................... G01V 3/12
                                                         342/22
4,300,220 A * 11/1981 Goff ........................ G01V 1/16
                                                         181/401
(Continued)

FOREIGN PATENT DOCUMENTS

CN  2047790 U  11/1989
CN  2453455 Y  10/2001
(Continued)

OTHER PUBLICATIONS

Gui-Ian et al., "The Design of Three-component ALL-fiberoptic Acceleration Seismometer," Journal of Optoelectronics Laser vol. 13 No. 1 Jan. 2002.
(Continued)

*Primary Examiner* — Hovhannes Baghdasaryan
*Assistant Examiner* — Jonathan D Armstrong
(74) *Attorney, Agent, or Firm* — Hamilton, Brook, Smith & Reynolds, P.C.

(57) ABSTRACT

The invention discloses an omnidirectional vector electrostatic levitation geophone, comprising: a regular tetrahedron hollowed-out structure, and an inner hollowed-out base and an outer hollowed-out base that are provided inside and outside the regular tetrahedron hollowed-out structure and at equal distance from the regular tetrahedron hollowed-out structure, and have the same structure as and different size from the regular tetrahedron hollowed-out structure; the regular tetrahedron hollowed-out structure has a solid part and a hollowed-out part of each surface thereof, the solid part is a quadrangle divided from angular bisectors of two angles on each surface and an isosceles triangle that abuts the solid part by a surface central point, and the hollowed-out part is two triangles that are divided from the angular bisectors of the two angles and abut each other by a surface center. In the invention, a spatial full-vector detection struc-
(Continued)

ture is designed, a completely new omnidirectional vector geophone technology is realized, thereby completing detection of full information including frequency, amplitude, phase, vibration direction of the seismic wave field, especially divergence and curl of a wave force field.

10 Claims, 9 Drawing Sheets

(56) References Cited

U.S. PATENT DOCUMENTS

| | | | |
|---|---|---|---|
| 4,791,617 A * | 12/1988 | Seymour | G01V 1/181 |
| | | | 310/329 |
| 5,790,388 A | 8/1998 | Buckingham | |
| 5,889,731 A | 3/1999 | Laurent | |
| 6,291,901 B1 | 9/2001 | Cefo | |
| 6,791,901 B1 * | 9/2004 | Robertsson | G01V 1/20 |
| | | | 367/58 |
| 10,578,757 B2 | 3/2020 | Dong et al. | |
| 2005/0090987 A1 | 4/2005 | Amundsen et al. | |
| 2008/0238429 A1 * | 10/2008 | Safinya | G01V 3/083 |
| | | | 324/348 |
| 2010/0116059 A1 | 5/2010 | Gan et al. | |
| 2010/0195439 A1 | 8/2010 | Muyzert | |
| 2011/0063946 A1 | 3/2011 | Muyzert et al. | |
| 2014/0219053 A1 | 8/2014 | Goujon et al. | |
| 2018/0246237 A1 | 8/2018 | Chen | |
| 2018/0246238 A1 * | 8/2018 | Dong | G01V 1/181 |

FOREIGN PATENT DOCUMENTS

| | | |
|---|---|---|
| CN | 1460867 A | 12/2003 |
| CN | 1908674 A | 2/2007 |
| CN | 101002088 A | 7/2007 |
| CN | 201043915 Y | 4/2008 |
| CN | 101893720 A | 11/2010 |
| CN | 102023309 A | 4/2011 |
| CN | 102053261 A | 5/2011 |
| CN | 102095893 A | 6/2011 |
| CN | 201852944 U | 6/2011 |
| CN | 102341728 A | 2/2012 |
| CN | 102692646 A | 9/2012 |
| CN | 103048683 A | 4/2013 |
| CN | 103513273 A | 1/2014 |
| CN | 103645497 A | 3/2014 |
| CN | 103675350 A | 3/2014 |
| CN | 104237934 A | 12/2014 |
| CN | 104808242 A | 7/2015 |
| CN | 105259566 A | 1/2016 |
| CN | 105388514 A | 3/2016 |
| CN | 105467440 A | 4/2016 |
| DE | 266183 A1 | 3/1989 |
| GB | 2358469 A | 7/2001 |
| JP | 6313729 A | 11/1994 |
| JP | 200610520 A | 1/2006 |
| WO | 02/068996 A1 | 9/2002 |
| WO | 2006/043046 A1 | 4/2006 |
| WO | 2011032080 A2 | 3/2011 |
| WO | 2012027160 A1 | 3/2012 |
| WO | 2013092747 A1 | 6/2013 |

OTHER PUBLICATIONS

J. Robertsson and A. Curtis, "Wavefield separation using densely deployed three-component single-sensor groups in land surface-seismic recordings," Geophysics vol. 67, No. 5, 1624-1633 Sep./Oct. 2002.

M. B.Dobrin, "Detector," An overview of geophysical exploration, 62-65 1993.

Bangliu et al., "Technical Theory and Practice for Multi-component Seismic Exploration," Theory and practice of multi component seismic exploration technology, 77-78 2007.

H. Lixin, "Detector Coupling Theories and Experiments," Theory and experiment of geophone coupling, 2009.

Keyang, C. et al., "High-order high-density 3D multi-wave multi-component elastic wave field separating forward numerical simulation," Reservoir Evaluation and Development, vol. 3; No. 2; 6-13 (2013).

Li, C., "Development on multi-wave and multi-component seismic exploration technology," Resource Environment and Energy Saving & Disaster Reduction, vol. 7.

Qifeng, S. and Qizhen, D., "A review of the multi-component seismic data processing," Petroleum Exploration and Development, vol. 38; No. 1; 67-71 (2011).

Zhi-Yuan, L. et al., "Improved method of separating P- and S-waves using divergence and curl," Chinese Journal of Geophysics, vol. 56; No. 6; 2012-2021 (2013).

Carrion, et al., "Detailed Modeling of Designs for the Polar Seismic TETwalker," Center for Remote Sensing of Ice Sheets, Technical Report, Nov. 8, 2007.

Robertsson, et al., "Wavefield separation using a volume distribution of three component recordings," Geophysical Research Letters, vol. 26, No. 18, pp. 2821-2824, Sep. 15, 1999.

Curtis, A., et al., "Wavefield separation and estimation of near surface velocities in land seismic," 62nd EAGE Conference & Exhibition, May 29, 2000.

Toda, R., et al., "Electrostatically Levitated Spherical 3-Axis Accelerometer," IEEE, 2012.

Chinese Search Report for Chinese Patent Application No. 2015107111118, entitled: "Omni-Directional Vector Electrostatic Suspension Seismic Wave Detector," dated Apr. 28, 2017.

International Search Report for International Application No. PCT/CN2016/099826, entitled: "Omni-Directional Vector Electrostatic Suspension Seismic Wave Detector," dated Dec. 22, 2016.

Peng'an, Q., "Analysis of the Study on Monolithic Multi-Dimensional Accelerometers," Chinese Journal of Scientific Instrument, vol. 28; No. 8; 39-42 (2007).

* cited by examiner

OMNIDIRECTIONAL VECTOR ELECTROSTATIC LEVITATION GEOPHONE

RELATED APPLICATIONS

This application is a continuation of International Application No. PCT/CN2016/099826, filed Sep. 23, 2016, which designates the U.S., published in Chinese, and claims priority under 35 U.S.C. § 119 or 365(c) to Chinese Application No. 201510711111.8 filed on Oct. 28, 2015. The entire teachings of the above applications are incorporated herein by reference.

TECHNICAL FIELD

The invention relates to the technical field of a wave detector, in particular to an omnidirectional vector electrostatic levitation geophone.

BACKGROUND

Based on wave theory, wave information is not limited to amplitude, frequency, phase of wave, but also includes various spatial motion properties such as vibration nature and direction of a wave field, divergence and curl vectors of a force field, etc. These spatial motion properties include abundant information that is indispensable to wave research, which play important roles in aspects such as wave field separation, signal-to-noise ratio, fidelity, imaging precision, medium attribute analysis, or the like. However, an existing seismic acquisition and detection technology can only detect information such as amplitude, frequency, phase or the like, and could not detect the spatial properties of wave motions.

For this reason, the related art proposes an omnidirectional vector seismic wave detector, which builds a space vector structure according to a field theory formula in a basic unit of a high performance mature commodity electromagnetic and capacitive seismic detector, to realize detection of full information of the seismic wave field.

But the seismic wave detector in the prior art has a very big defect, which affects further improvement of performance of an omnidirectional vector geophone that is built in a unit device of the seismic wave detector, this is a question of relative motion: there must be a relatively immovable reference system for measurement of any motion and vibration. Generally the ground which is immovable is taken as reference. How to build an immovable reference system for measurement of ground wave and vibration is an important and difficult question.

A traditional wave detector supports a mass block by spring suspension, and this problem is solved by a method of causing relative motion between the mass block and the ground by delay of a spring. But inverse relation between a K coefficient of the spring and the delay is the defect. The softer the spring is, the longer the delay is, the larger the relative motion is, the higher the sensitivity is, the worse the fidelity is; the harder the spring is, the shorter the delay is, the better the fidelity is, the lower the sensitivity is. If the mass block moves synchronously with the ground, there is no delay, and although the fidelity is good, there is no relative motion, the sensitivity is zero, then the wave detector fails. Thus it can be seen that the sensitivity and the fidelity become a pair of contradictions. So all the time, design and manufacture of the spring in core technology of the wave detector is extremely important.

Explanation is made by the following formulas:

a spring force balance formula: $(g+a)m=-kx$, a spring vibration formula:

$$x = A\cos\left(\sqrt{\frac{k}{m}}\,\tau + \varphi\right),$$

a spring wave detector output formula:

$$U = T \times \frac{(a)m}{k} \cdot \sin\left(\sqrt{\frac{k}{m}}\,\tau + \varphi\right) \cdot e^{-r\tau},$$

wherein, x denotes displacement of the mass block/spring vibrator; A denotes wave field amplitude; U denotes output; T denotes magnetic field strength, and if is replaced with electric field strength, it is the function of x; a denotes an acceleration to be measured; m denotes mass of a mover system; k denotes a spring coefficient; τ denotes system response time; φ denotes phase; and r denotes a damping coefficient.

It can be seen from the above several formulas that, k is at a denominator position when affecting the sensitivity, and the smaller the better; and k is at a numerator position when affecting the fidelity, and the larger the better.

An MEMS wave detector is a capacitive-type representative, FIG. 1 is a schematic diagram of operating principle of an MEMS capacitive wave detector according to the related art, as shown in FIG. 1, the MEMS wave detector is provided with a spring for connecting a mass body and a frame. The MEMS wave detector converts part of support force into sensitivity by a capacity based distance measuring in cooperation with an electrostatic force negative feedback technology, which partially solves the problem, and thus performance indicators have been greatly improved.

If the support force can be totally converted into sensitivity, fidelity and sensitivity can be combined ideally, then the performance indicators may be improved more greatly. But due to space structure problem, force balance of the existing MEMS wave detector is not three dimensional, it can realize levitation in a three-dimensional space not merely depending on electrostatic force, and also needs a spring structure for supporting, thus contradiction between the sensitivity and the fidelity still exists such that improvement of performance thereof is limited.

It can be seen based on the above analysis on operating principle of the capacitive wave detector that, a spring is a key factor for restricting the sensitivity and the fidelity. An electromagnetic type wave detector is even more supported totally by a spring, spring resonance plays a dominant role and has worse performance.

It can be seen based on the above analysis on operating principle of the MEMS wave detector that, the spring plays a non-negligible role and still restricts improvement of the performance.

FIG. 2 is a schematic diagram of directional response of an ideal single wave detector in a pressure wave field, and FIG. 3 is a schematic diagram of directional response of the ideal single wave detector in a shear wave field, for describing operating directivity of the wave detector. As shown in FIGS. 2 and 3, the output of a wave detector is realized based on the formula: out=A•n=a×b cos θ. Wherein, A denotes wave field function and vector; n denotes a unit vector of the wave detector in the operating directivity; a denotes instantaneous amplitude of a wave field A in a vibration direction;

b denotes sensitivity of the wave detector; θ denotes an angle between the operating direction of the wave detector and the vibration direction of the wave field at position of the wave detector; p denotes a pressure wave subscript; S denotes a shear wave subscript.

Specifically as shown in FIG. 2, the output of a wave detector in the pressure wave field is realized based on the following formula:

out=$A_p \cdot n = a_p \times b \cos \theta_p$; wherein, $A_p$ denotes an isochronous surface of the pressure wave field; $a_p$ denotes an instantaneous displacement of the wave field $A_p$ in a normal direction at the position of the wave detector; b denotes sensitivity of the wave detector; $\theta_p$ denotes an angle between the operating direction of the wave detector and the vibration direction of the wave field.

As shown in FIG. 3, the output of a wave detector in the shear wave field is realized based on the following formula:

out=$A_s \cdot n = a_s \times b \cos \theta_s$; wherein, $A_s$ denotes an isochronous surface of the shear wave field; as denotes an instantaneous displacement of the wave field $A_s$ in a vibration vector direction at the position of the wave detector; b denotes sensitivity of the wave detector; $\theta_s$ denotes an angle between the operating direction of the wave detector and the vibration direction of the wave field.

FIGS. 2 and 3 and the above formulas do not include other performance of an electromagnetic capacitance wave detector, only include directional description. The above formulas are only used for describing a single wave detector, which satisfies directional requirement of multi-dimensional space structure.

Assuming that all wave detectors have the same sensitivity, b can be used as a constant, or can be made equal to 1, which has no influence on mathematical physical significance. A wave field amplitude extreme value can also be regarded as being stable in a local area that is much larger than volume of the wave detector, and can be temporarily regarded as a constant in consideration of response of the wave detector.

Although the electromagnetic capacitance wave detector has an operating direction, on the basis that a single wave detector outputs a single known variable, two unknown numbers including a primitive function and an angle cannot be solved from only one equation.

In conclusion, the existing wave detector has the following defects:

1. A common wave detector has no functions of detecting curl, divergence and vector, and it detects a projection of the vector, as shown in FIG. 2; a hydrophone can detect divergence, but has no functions of detecting a curl vector and a linear vector; a three-component wave detector is an orthogonal combination of three directivities as shown in FIG. 2, has a function of detecting a linear vector but has no function of detecting divergence or curl.

2. In all spring support structures, sensitivity and fidelity are mutual restrictive, so that performance improvement capability is limited.

3. Curl and linear vector separated structure in research and development has a large overall volume.

4. There is no curl and linear vector same-mechanism structure.

For the above defects in the related art, there has not yet come up with an effective solution.

SUMMARY

The invention provides an omnidirectional vector electrostatic levitation geophone, to at least solve the problem of the related art that a spring structure of the wave detector restricts sensitivity and fidelity.

According to an aspect of the invention, there is provided with an omnidirectional vector electrostatic levitation geophone, comprising: a regular tetrahedron hollowed-out structure, and an inner hollowed-out base and an outer hollowed-out base that are provided inside and outside the regular tetrahedron hollowed-out structure and at equal distance from the regular tetrahedron hollowed-out structure, and have the same structure as and different size from the regular tetrahedron hollowed-out structure;

the regular tetrahedron hollowed-out structure has a solid part and a hollowed-out part of each surface thereof, the solid part is a quadrangle divided from angular bisectors of two angles on each surface and an isosceles triangle that abuts the solid part by a surface central point, and the hollowed-out part is two triangles that are divided from the angular bisectors of the two angles and abut each other by a surface central point;

an outer surface of each surface of the inner hollowed-out base is plated with a metal layer; wherein size of the metal layer is smaller than that of the quadrangle and the isosceles triangle of the inner hollowed-out base, and the metal layer on the quadrangle of the inner hollowed-out base and the metal layer on the isosceles triangle do not contact each other;

an inner surface of each surface of the outer hollowed-out base is plated with a metal layer; wherein size of the metal layer is smaller than that of the quadrangle and the isosceles triangle of the outer hollowed-out base, and the metal layer on the quadrangle of the outer hollowed-out base and the metal layer on the isosceles triangle do not contact each other.

Preferably, the regular tetrahedron hollowed-out structure includes a main triangular surface; one of the angles of the main triangular surface is defined as a first vertex angle of the regular tetrahedron hollowed-out structure, the first vertex angle is an angle of the quadrangle of the solid part of the main triangular surface;

the other surface on which a bottom edge opposite to the first vertex angle is defined as a first side surface of the regular tetrahedron hollowed-out structure, a midpoint of the bottom edge opposite to the first vertex angle slides in an anti-clockwise direction on the main triangular surface and meets an angle on the first side surface that is defined as a second vertex angle, and the second vertex angle is an angle of the quadrangle of the solid part of the first side surface;

the other surface on which a bottom edge opposite to the second vertex angle is defined as a second side surface of the regular tetrahedron hollowed-out structure, a midpoint of the bottom edge opposite to the second vertex angle slides in a clockwise direction on the first side surface and meets an angle on the second side surface that is defined as a third vertex angle, and the third vertex angle is an angle of the quadrangle of the solid part of the second side surface;

the other surface on which a bottom edge opposite to the third vertex angle is defined as a third side surface of the regular tetrahedron hollowed-out structure, a midpoint of the bottom edge opposite to the third vertex angle slides in an anti-clockwise direction on the second side surface and meets an angle on the third side surface that is defined as a fourth vertex angle, and the fourth vertex angle is an angle of the quadrangle of the solid part of the third side surface; or, the first vertex angle, the second vertex angle, the third vertex angle and the fourth vertex angle correspond to a first vertex, a second vertex, a third vertex and a fourth vertex of the regular tetrahedron hollowed-out structure respectively;

the first vertex angle is an angle of the quadrangle of the solid part of the main triangular surface; the third vertex is at an angle of the first side surface, is an angle of the quadrangle of the solid part of the first side surface; the fourth vertex is at an angle of the second side surface, is an angle of the quadrangle of the solid part of the second side surface; the second vertex is at an angle of the third side surface, is an angle of the quadrangle of the solid part of the third side surface.

Preferably, the regular tetrahedron hollowed-out structure is of a metal material; the inner hollowed-out base and the outer hollowed-out base are of insulation materials; a first circuit is connected between the metal layers on the quadrangle on surfaces that are symmetric on the outer hollowed-out base and the inner hollowed-out base; a second circuit is connected between the metal layers on the isosceles triangles on surfaces that are symmetric on the outer hollowed-out base and the inner hollowed-out base.

Preferably, surfaces of the regular tetrahedron hollowed-out structure, surfaces of the metal layers on the inner hollowed-out base and the outer hollowed-out base are all oxidized to form a layer of insulating film.

Preferably, a vertex right below the main triangular surface of the outer hollowed-out base is connected to a conical tail cone with a conical point facing vertically downwards.

Preferably, the omnidirectional vector electrostatic levitation geophone further comprises: a spherical shell divided into an upper-half spherical shell and a lower-half spherical shell, the outer hollowed-out base, the regular tetrahedron hollowed-out structure and the inner hollowed-out base are placed inside the spherical shell, the lower-half spherical shell is provided with a tail cone hole at the bottom thereof, and the tail cone passes through the tail cone hole of the lower-half spherical shell.

Preferably, the upper-half spherical shell and the lower-half spherical shell are respectively provided on edges thereof with projections that are matched with each other, the projections of the upper-half spherical shell and the lower-half spherical shell are fixed by a fixing assembly.

Preferably, a signal line hole can be provided on the spherical shell, signal output lines of the first circuit and the second circuit pass through the signal line hole.

Preferably, waterproof may be sealed by a silicone or rubber material at the joint gap between the upper-half spherical shell and the lower-half spherical shell of the spherical shell, the tail cone hole and the signal line hole.

Preferably, each surface of the outer hollowed-out base, the regular tetrahedron hollowed-out structure and the inner hollowed-out base is any curved surface or a plane.

In the invention, based on divergence and curl equations of field theory, a spatial full-vector detection structure is designed, a brand-new omnidirectional vector geophone technology is worked out to realize detection of full information including frequency, amplitude, phase, vibration direction of the seismic wave field, especially divergence and curl of a wave force field.

The invention has the following technical effects:

1. sensitivity and fidelity of the wave detector are higher than the existing wave detector based on electrostatic levitation structure;

2. functions of detecting curl, divergence and vector;

3. curl, divergence and linear vectors are combined such that the overall volume of the wave detector is smaller;

4. A curl and linear vector same-mechanism structure provides a direct physical mathematical relationship.

BRIEF DESCRIPTION OF THE DRAWINGS

The drawings described here are used for providing further understanding to the present invention and constitute a part of the present application, and schematic embodiments of the invention and the description thereof are used for explaining the invention and do not constitute definition to the invention. In the drawings.

DETAILED DESCRIPTION

Hereinafter the technical solution in the embodiments of the present invention will be described clearly and integrally in combination with the accompanying drawings in the embodiments of the present invention, and obviously the described embodiments are merely part of the embodiments, not all of the embodiments. Based on the embodiments of the present invention, all other embodiments that are obtained by persons skilled in the art without making creative efforts fall within the protection scope of the present invention.

The invention provides an omnidirectional vector electrostatic levitation geophone, which is omni-directionally evenly balanced in terms of spatial structure, this is a structural advantage that none of wave detectors in the prior art possesses, and complete electrostatic levitation can be realized by the structural advantage. Specific structure of the omnidirectional vector electrostatic levitation geophone is introduced below.

Figure 4:
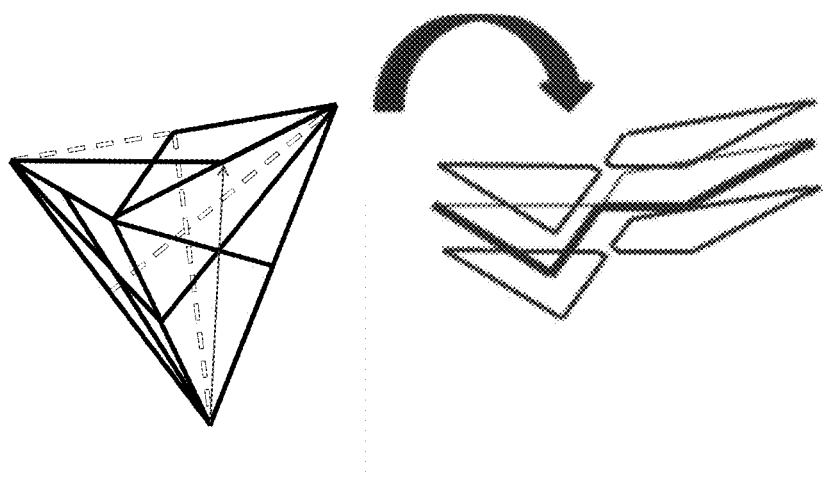
FIG. 4 is a structural schematic diagram of an omnidirectional vector electrostatic levitation geophone based on an embodiment of the invention.

FIG. 4 is a structural schematic diagram of an omnidirectional vector electrostatic levitation geophone based on an embodiment of the invention. As shown in FIG. 4, the omnidirectional vector electrostatic levitation geophone comprises: a regular tetrahedron hollow-out structure, and an inner hollowed-out base and an outer hollowed-out base that are provided inside and outside the regular tetrahedron hollowed-out structure and at equal distance from the regular tetrahedron hollowed-out structure, and have the same structure as and different size from the regular tetrahedron hollowed-out structure; that is, the inner hollowed-out base and the outer hollowed-out base are both of regular tetrahedron structure, except that the outer hollowed-out base sleeves outside the regular tetrahedron hollowed-out structure and with a size being larger than the regular tetrahedron hollowed-out structure, the inner hollowed-out base is disposed inside the regular tetrahedron hollowed-out structure and with a size being smaller than the regular tetrahedron hollowed-out structure. Each surface of the regular tetrahedron hollowed-out structure, the inner hollowed-out base and the outer hollowed-out base is formed by a quadrilateral pole plate and an isosceles triangle pole plate. FIG. 4 shows at the right side a pole plate structure of a surface of the omnidirectional vector electrostatic levitation geophone, in the middle a surface of the regular tetrahedron hollowed-out structure, at upper and lower sides a surface of the outer hollowed-out base and the inner hollowed-out base respectively.

Figure 5:
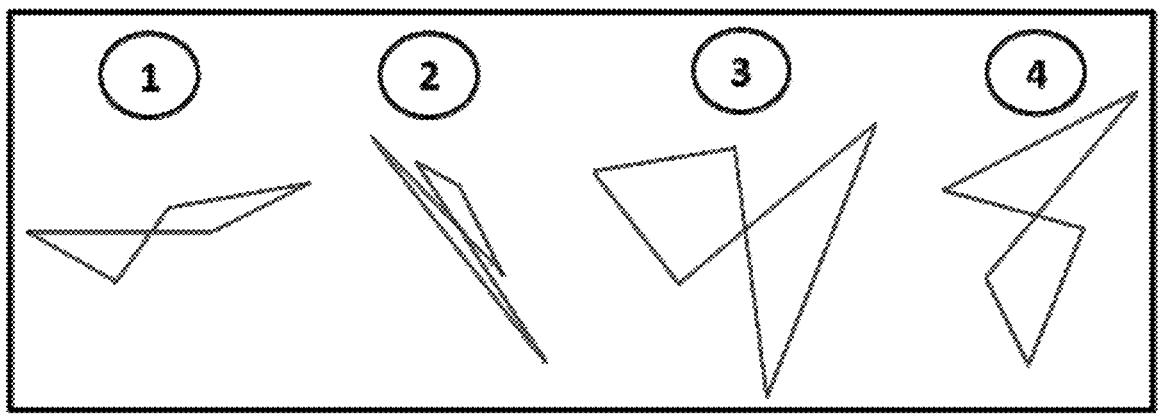
FIG. 5 is a structural schematic diagram of each surface of a regular tetrahedron hollowed-out structure based on an embodiment of the invention.

FIG. 5 is a structural schematic diagram of each surface of a regular tetrahedron hollowed-out structure based on an embodiment of the invention. As shown in FIG. 5, the quadrilateral pole plate and the isosceles triangle pole plate on each surface are connected at a surface geometric center. The embodiment provides a preferably embodiment, for accurately dividing the quadrilateral pole plate and the isosceles triangle pole plate, that is: the regular tetrahedron hollowed-out structure has a solid part and a hollowed-out part of each surface thereof, the solid part is a quadrangle divided from angular bisectors of two angles on each surface and an isosceles triangle that abuts the solid part by a surface central point, and the hollowed-out part is two triangles that are divided from the angular bisectors of the two angles and abut each other by a surface central point. Respective geometric centers of the quadrangle and the isosceles triangle of the solid part are at the same distance from a surface geometric center, assuming that the distance is a, an edge length of the regular tetrahedron hollowed-out structure is $L=3\sqrt{3}a$.

By the preferable embodiment, the solid part and the hollowed-out part of each surface can be divided accurately, so as to accurately constitute a balance structure of the omnidirectional vector electrostatic levitation geophone, to provide basis for realizing electrostatic levitation.

Location division of the quadrilateral pole plate and the isosceles triangle pole plate on each surface of the regular tetrahedron hollowed-out structure needs to conform to a particular requirement, only in this way normal operation of the omnidirectional vector electrostatic levitation geophone can be ensured. There are at least two methods for dividing positions of the quadrilateral pole plate and the isosceles triangle pole plate on each surface, which are introduced respectively below.

Figure 6:
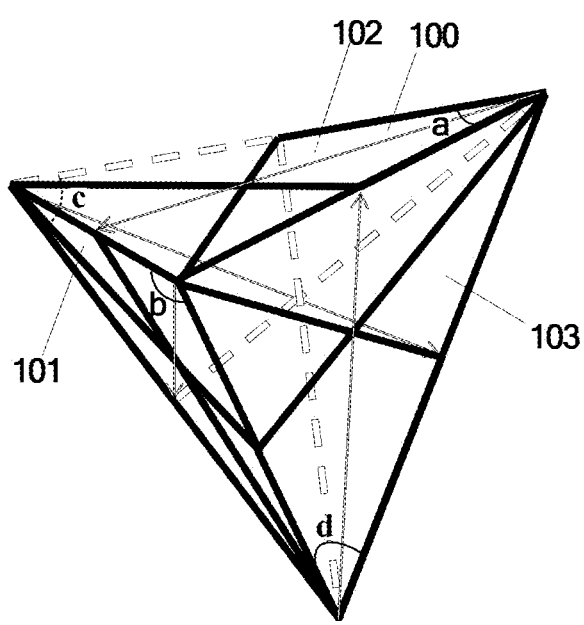
FIG. 6 is a first kind of structural schematic diagram of an omnidirectional vector electrostatic levitation geophone based on an embodiment of the invention.

1) FIG. 6 is a first kind of structural schematic diagram of an omnidirectional vector electrostatic levitation geophone based on an embodiment of the invention. As shown in FIG. 6, the regular tetrahedron hollowed-out structure includes a main triangular surface 100, one of the angles of the main triangular surface 100 is defined as a first vertex angle a of the regular tetrahedron hollowed-out structure, the first vertex angle a is an angle of the quadrangle of the solid part of the main triangular surface 100;

the other surface on which a bottom edge opposite to the first vertex angle a is defined as a first side surface 101 of the regular tetrahedron hollowed-out structure, a midpoint of the bottom edge opposite to the first vertex angle a slides along an anticlockwise direction on the main triangular surface 100 to meet an angle on the first side surface 101 that is defined as a second vertex angle b, the second vertex angle b is an angle of the quadrangle of the solid part of the first side surface 101; it is necessary to explain that, the anticlockwise direction is a direction when the main triangular surface 100 is placed horizontally upwards and a person faces the first side surface 101, and an anticlockwise direction and a clockwise direction mentioned below both adopt this method.

The other surface on which a bottom edge opposite to the second vertex angle b is defined as a second side surface 102 of the regular tetrahedron hollowed-out structure, a midpoint of the bottom edge opposite to the second vertex angle b slides in a clockwise direction on the first side surface 101 and meets an angle on the second side surface 102 that is defined as a third vertex angle c, and the third vertex angle c is an angle of the quadrangle of the solid part of the second side surface 102;

the other surface on which a bottom edge opposite to the third vertex angle c is defined as a third side surface 103 of the regular tetrahedron hollowed-out structure, a midpoint of the bottom edge opposite to the third vertex angle c slides in an anti-clockwise direction on the second side surface 102 and meets an angle on the third side surface 103 that is defined as a fourth vertex angle d, and the fourth vertex angle d is an angle of the quadrangle of the solid part of the third side surface 103.

Figure 7:
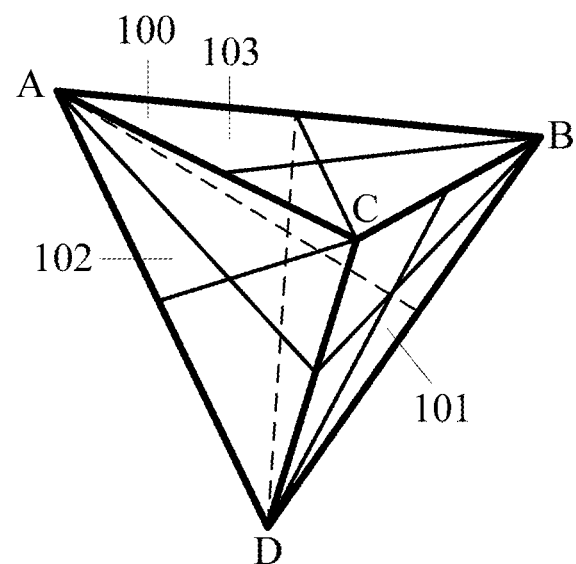
FIG. 7 is a second kind of structural schematic diagram of an omnidirectional vector electrostatic levitation geophone based on an embodiment of the invention.

2) FIG. 7 is a second kind of structural schematic diagram of an omnidirectional vector electrostatic levitation geophone based on an embodiment of the invention. As shown in FIG. 7, the above-described first vertex angle a, second vertex angle b, third vertex angle c and fourth vertex angle d correspond respectively to a first vertex A, a second vertex B, a third vertex C and a fourth vertex D of the regular tetrahedron hollowed-out structure.

The first vertex angle a is an angle of the quadrangle of the solid part of the main triangular surface 100; the third vertex C is at an angle of the first side surface 101, is an angle of the quadrangle of the solid part of the first side surface 101; the fourth vertex D is at an angle of the second side surface 102, is an angle of the quadrangle of the solid part of the second side surface 102; the second vertex B is at an angle of the third side surface 103, is an angle of the quadrangle of the solid part of the third side surface 103.

The above-described two methods of division can also be realized by the following methods:

1) Four surfaces of the regular tetrahedron hollowed-out structure are respectively provided with a unique straight line that connects an angle, a surface geometric center and a midpoint of an opposite edge. The regular tetrahedron hollowed-out structure is disposed with one surface facing upwards (i.e., the above-described main triangular surface), a connection line of a tetrahedron geometric center and a geometric center of this plane is vertically upward and defined as a vertical shaft (also called a main shaft) of the omnidirectional vector electrostatic levitation geophone, and is also a first line vector axis, direction of the above-described straight line that is disposed on the surface facing upwards is defined as a from-north direction (also called a first direction) of the omnidirectional vector electrostatic levitation geophone. The angle on the first side surface that is met when sliding anticlockwise along an arris that vertically crosses the from-north direction points to a midpoint of an opposite arris in a direction which is defined as a second direction, and the angle on the second side surface that is met when sliding clockwise along an arris that vertically crosses the second direction points to a midpoint of an opposite arris in a direction which is defined as a third direction, and the angle on the third side surface that is met when sliding anticlockwise along an arris that vertically crosses the third direction points to a midpoint of an opposite arris in a direction which is defined as a fourth direction. Four angles through which the first direction, the second direction, the third direction and the fourth direction pass are respectively angles of the quadrangle on four planes of the regular tetrahedron hollowed-out structure.

2) On the above-described surface disposed to face upwards, the angle that is met when sliding clockwise along an arris that vertically crosses the above-described from-north direction points to a midpoint of an opposite arris in a direction which is defined as a fifth direction, and the angle that is met when sliding anticlockwise along an arris that vertically crosses the fifth direction points to a midpoint of an opposite arris in a direction which is defined as a sixth direction, and the angle that is met when sliding clockwise along an arris that vertically crosses the sixth direction points to a midpoint of an opposite arris in a direction which is defined as a seventh direction. Four angles through which the from-north direction, the fifth direction, the sixth direction and the seventh direction pass are respectively angles of the quadrangle on four planes of the regular tetrahedron hollowed-out structure.

Figure 8:
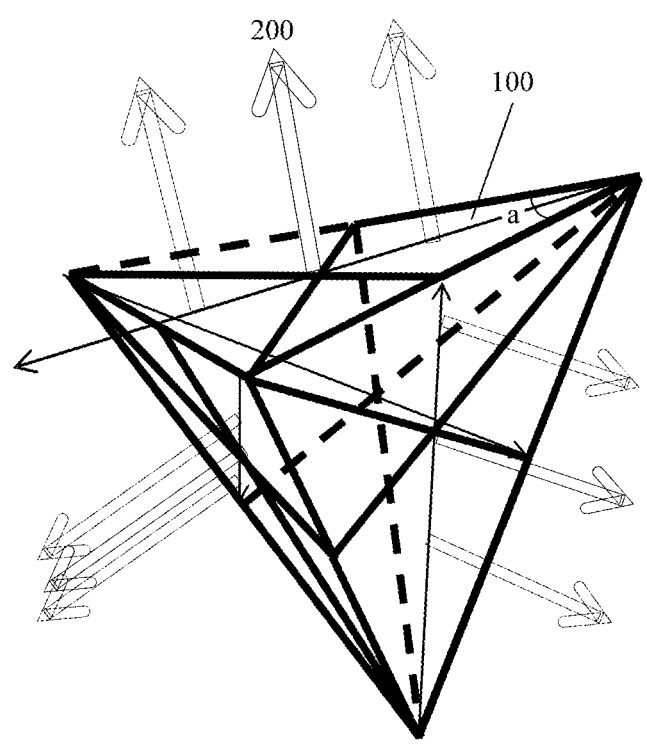
FIG. 8 is a schematic diagram of work vector of a first kind of structure of an omnidirectional vector electrostatic levitation geophone based on an embodiment of the invention.
Figure 9:
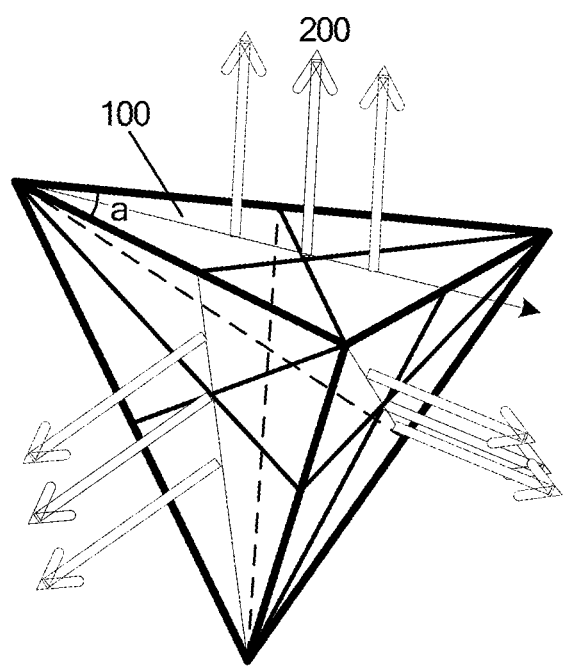
FIG. 9 is a schematic diagram of work vector of a second kind of structure of an omnidirectional vector electrostatic levitation geophone based on an embodiment of the invention.

FIG. 8 is a schematic diagram of work vector of a first kind of structure of an omnidirectional vector electrostatic levitation geophone based on an embodiment of the invention, FIG. 9 is a schematic diagram of work vector of a second kind of structure of an omnidirectional vector electrostatic levitation geophone based on an embodiment of the invention. The arrow on each surface in FIGS. 8 and 9 indicates a working vector, a center shaft vertical to the main triangular surface 100 is disposed to be a main shaft 200, an angular bisector of the first vertex angle a on the main triangular surface 100 is in a direction which is defined as a from-north direction.

Figure 10:
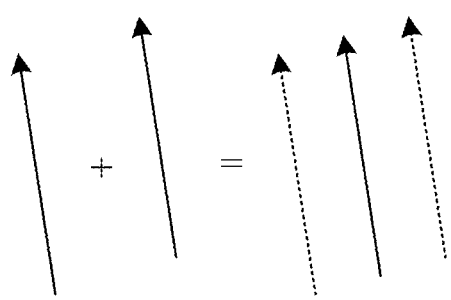
FIG. 10 is a schematic diagram of parallel vectors based on an embodiment of the invention.

FIG. 10 is a schematic diagram of parallel vectors based on an embodiment of the invention. As shown in FIG. 10, in a smooth continuous wave field, the distance is far less than a sum of dot products of two parallel vectors of the wavelength with the wave field that is divided by 2, and is equal to a dot product of a vector at a middle position with the wave field.

Figure 11:
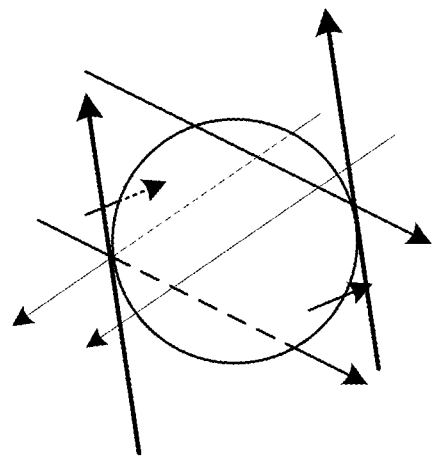
FIG. 11 is a space vector relationship diagram of an omnidirectional vector electrostatic levitation geophone based on an embodiment of the invention.

FIG. 11 is a space vector relationship diagram of an omnidirectional vector electrostatic levitation geophone based on an embodiment of the invention. As shown in FIG. 11, the individual arrows indicate a working vector on each surface. The circle in FIG. 11 indicates an inner tangent sphere that is enclosed by eight space vectors of the omnidirectional vector electrostatic levitation geophone, a diameter of which is distance between the quadrangle and the geometric center of the isosceles triangle on one surface of the regular tetrahedron hollowed-out structure of the omnidirectional vector electrostatic levitation geophone.

Figure 1:
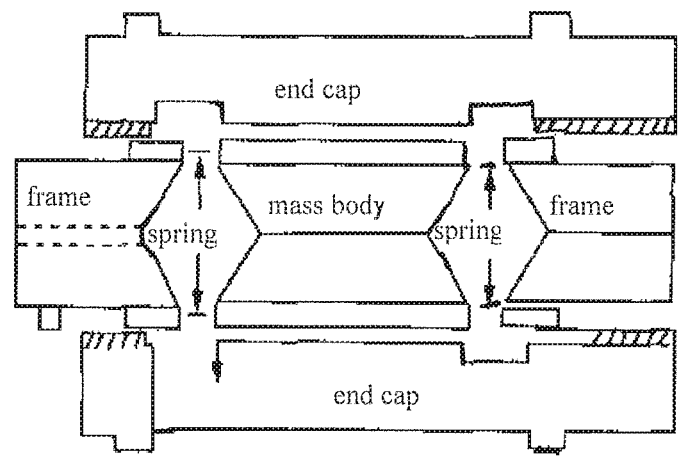
FIG. 1 is a schematic diagram of operating principle of an MEMS capacitive wave detector according to the related art.
Figure 2:
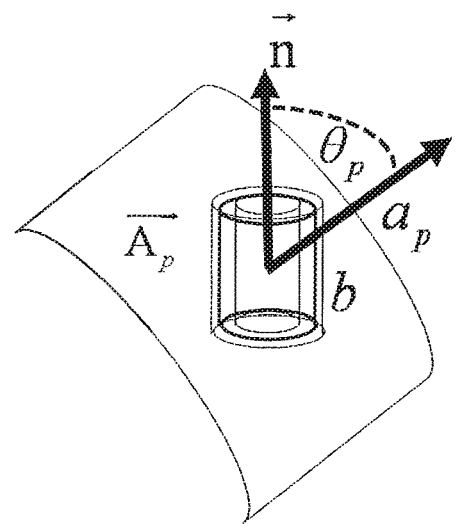
FIG. 2 is a schematic diagram of directional response of an ideal single wave detector in a pressure wave field.
Figure 3:
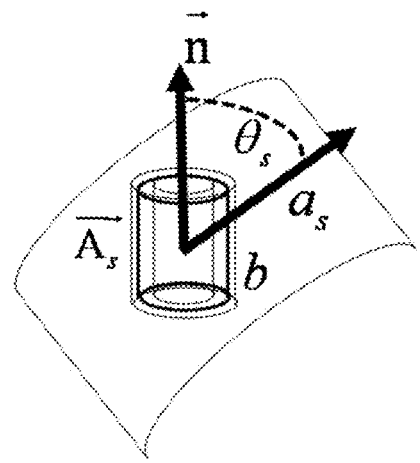
FIG. 3 is a schematic diagram of directional response of the ideal single wave detector in a shear wave field.

A plurality of wave detectors having directivities shown in FIG. 2 are combined based on in a space vector direction as shown in FIG. 2, namely a space vector relationship shown in FIG. 11, which can have the function of an omnidirectional space vector. Such structure has not only functions of detecting a space line vector, a curl vector and divergence, but also has a space force balance structure foundation required for electrostatic levitation, which can solve the problem of negative effects caused by the spring.

Figure 12:
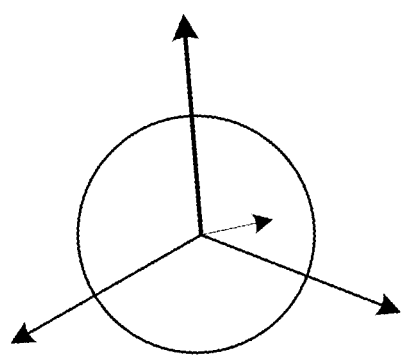
FIG. 12 is a structural schematic diagram of total integral equivalent Gaussian divergence based on an embodiment of the invention.
Figure 13:
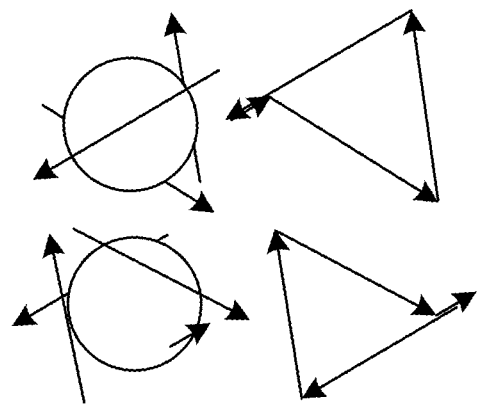
FIG. 13 is a structural schematic diagram of stokes' integral positive and negative curl equivalence based on an embodiment of the invention.

FIG. 12 is a structural schematic diagram of total integral equivalent Gaussian divergence based on an embodiment of the invention, FIG. 13 is a structural schematic diagram of stokes' integral positive and negative curl equivalence based on an embodiment of the invention. It can be seen from the vector relationship as shown in FIGS. 12 and 13 that:

Based on Divergence Gaussian theorem:

$$\int\int\int_V divAdv = \oiint_s A \cdot ndS,$$

a divergence formula of the omnidirectional vector electrostatic levitation geophone in the embodiment of the invention can be obtained:

$$\int\int\int_V divAdv = \oiint_s A \cdot ndS = \frac{1}{m}\sum_{i=1}^{m} A \cdot n_i.$$

Based on Curl Stokes' formula:

$$\int\int_s rotA \cdot dS = \int\int_s rot\, A \cdot ndS = \oint A \cdot dl,$$

a positive curl formula of the embodiment of the invention can be obtained as $$\int\int_s rotAdS = \oint A \cdot dl = \frac{1}{m}\sum_{i=1}^{m} A \cdot \vec{dl_i}$$

as well as an anti-curl formula:

$$-\int\int_s rotAdS = \oint A \cdot dl = \frac{1}{m}\sum_{i=m+1}^{2m} A \cdot \vec{dl_i}.$$

Wherein, A is a wave field function, l is a detector response vector, i is an inner trace serial number of the detector, trace(i)=A·$\vec{l}_i$, is the collected internal trace data of the ith trace, on the above-described total integral equivalent Gaussian divergence structure: $\vec{l}_i$ is a first group, i=1-4, $\vec{l}_i$ is a third group, i=5-8. div indicates divergence, rot indicates curl, V indicates volume, dv indicates differential volume, S indicates area, dS indicates differential of area, m indicates the number of a regular m-hedron; $n_i$ indicates a wave response vector on a normal of the ith surface. Based on the trigonometric and differential product formulas, on the specific structure, $\vec{1}_i + \vec{1}_{m+i} = \vec{1}_i + \vec{1}_i = 2n_i$.

In order to realize electrostatic levitation, the regular tetrahedron hollowed-out structure of the omnidirectional vector electrostatic levitation geophone is of metal material, for example, the regular tetrahedron hollowed-out structure can be manufactured by a conductive plate having a certain thickness (assuming that the thickness is h), tantalum can be selected as the material of the conductive plate, after the hollowed-out part is removed based on the shape as shown in FIG. 5, in order to ensure that the overall regular tetrahedron hollowed-out structure is not dispersed, it is selectable to reserve the narrow edge.

Then the inner hollowed-out base and the outer hollowed-out base can be set as of insulation materials, an outer surface of each surface of the inner hollowed-out base is plated with a metal layer; wherein size of the metal layer is smaller than that of the quadrangle and the isosceles triangle of the inner hollowed-out base, as shown in the right side in FIG. 4, the metal layer on the quadrangle of the inner hollowed-out base and the metal layer on the isosceles triangle do not contact each other. An inner surface of each surface of the outer hollowed-out base is plated with a metal layer; wherein size of the metal layer is smaller than that of the quadrangle and the isosceles triangle of the outer hollowed-out base, as shown in the right side in FIG. 4, the metal layer on the quadrangle of the outer hollowed-out base and the metal layer on the isosceles triangle do not contact each other.

In order to prevent electricity crossing between the regular tetrahedron hollowed-out structure, the inner hollowed-out base and the outer hollowed-out base to affect smooth implementation of electrostatic levitation, and meanwhile to ensure safety of the omnidirectional vector electrostatic levitation geophone during use and accuracy during data measurement, the embodiment provides a preferable embodiment, i.e., surfaces of metal layers of the regular tetrahedron hollowed-out structure, the inner hollowed-out base and the outer hollowed-out base are all oxidized to form a layer of insulating film, e.g., can be oxidized to form an insulating film with thickness $h_1$ (tantalum pentoxide).

In order to ensure that the outer hollowed-out base and the inner hollowed-out base are at equal distance from the regular tetrahedron hollowed-out structure (assuming that the distance is d) when in a balanced state, distance between the outer hollowed-out base and the inner hollowed-out base should be set as $2d+h+2h_1$.

If material of the regular tetrahedron hollowed-out structure is selected, p denotes density, g denotes gravity acceleration of the earth, c denotes a dielectric constant, letting Tc=$\mu g/\varepsilon$, and letting $h_1$ to be 0.05 h, a general oxidation medium $\varepsilon_r$ is far larger than an air dielectric coefficient $\varepsilon_0$, letting h1 to be larger than $1/\varepsilon$ of d, then h1 and $\varepsilon_r$ can be ignored, Tc denotes a density and gravity ratio dielectric constant, which is introduced for briefing the formula. Floating voltage is: $U^2 = h\rho g d^2/(2\varepsilon_0) = 0.5\ T_c h d^2$; an edge length L of the regular tetrahedron hollowed-out structure is contained in the area and thus is cut off, which has nothing to do with the formula, and in practical application and design, the edge length is determined by combining values of thickness h of a movable pole plate and operating distance d between electrodes and based on process level and performance requirement, and is not prescribed specifically here.

In the design process of the omnidirectional vector electrostatic levitation geophone, device precision requirements, production process, puncture voltage, edge roundness to solve charge, stray capacitance inductance and etc., are all matters that must be taken into consideration. The puncture voltage is especially an important matter, thus maximum value of U that can be set needs to be smaller than a voltage that thickness $h_1$ of the insulating film can bear, and $h_1$ needs to be larger than $1/\varepsilon$ of the distance d between the regular tetrahedron hollowed-out structure and the outer hollowed-out base, the inner hollowed-out base.

In order to realize electrostatic levitation, the omnidirectional vector electrostatic levitation geophone needs to be connected into a circuit, specifically: a first circuit is connected between metal layers on quadrangle substrates on planes that are symmetric with respect to the regular tetrahedron hollowed-out structure on the outer hollowed-out base and the inner hollowed-out base; a second circuit is connected between metal layers on isosceles triangle substrates on planes that are symmetric with respect to the regular tetrahedron hollowed-out structure on the outer hollowed-out base and the inner hollowed-out base. The first circuit and the second circuit have the same circuit structure, and are just connected at different positions on the omnidirectional vector electrostatic levitation geophone. Different from the regular tetrahedron hollowed-out structure, 16 metal layers on the outer hollowed-out base and the inner hollowed-out base are cut off therebetween to ensure electricity insulation, circuit wirings and fixed supports between the planes are connected to and led out from the hollowed-out portion of the omnidirectional vector electrostatic levitation geophone.

Figure 14:
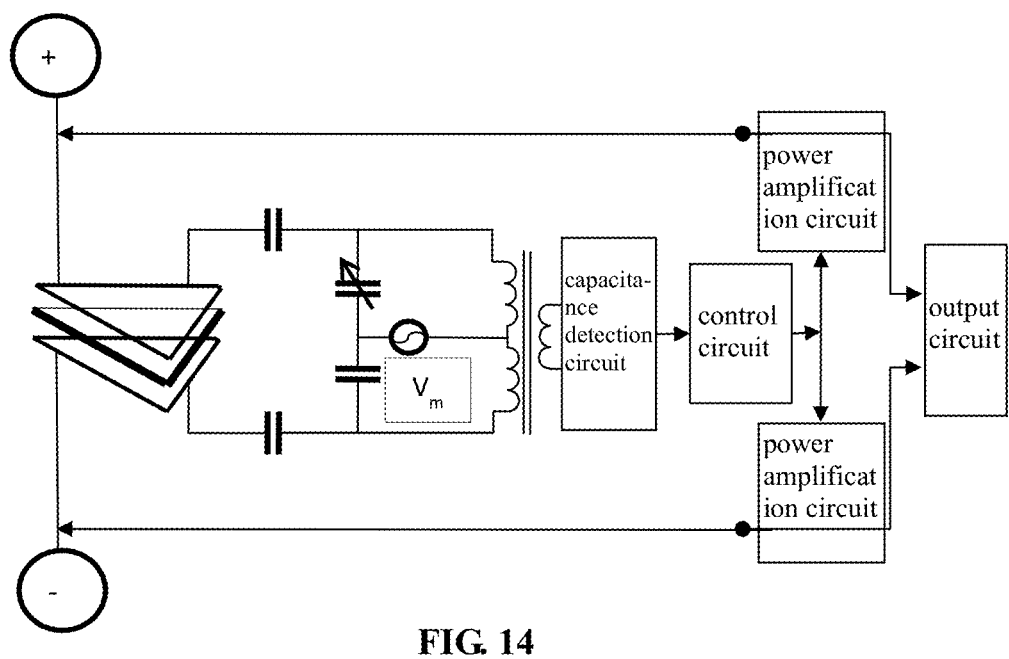
FIG. 14 is a circuit schematic diagram based on an embodiment of the invention.

FIG. 14 is a circuit schematic diagram based on an embodiment of the invention. As shown in FIG. 14, metal layers on opposite planes of the inner hollowed-out base and the outer hollowed-out base constitute a positive-and-negative voltage application pole plate, which is electrically connected at a capacitance bridge and a power amplifier output connection point of the circuit as shown in FIG. 14. Sinusoidal capacitance detection AC voltage of a high frequency (depending on size of the device, 10 kHz-1 MHz being selectable) is applied between the capacitance bridge and a transformer. When inner and outer pole plates (namely the metal layers on opposite planes of the inner hollowed-out base and the outer hollowed-out base) are at unequal distances from the corresponding movable pole plate (namely each plane of the regular tetrahedron hollowed-out structure), the capacitance bridge loses balance, a phase sensitive demodulation capacitance detection circuit outputs a control signal, to drive the power amplifier by a control circuit and apply inverse driving voltage to the inner and outer pole plates to generate an anti-external force electric field force, such that the movable pole plate goes back to the middle position to realize balance between the an electrostatic force and an external force. At this time relationship between the external force and the electrostatic force is decided by the formula: $U^2 = 0.5\ h\rho d^2(g+a)/\varepsilon$. In this formula, all of voltage U, gravity acceleration g and acceleration a are vectors, h and d denote respectively thickness of a metal suspension pole plate and distance between upper and lower pole plates of the regular tetrahedron hollowed-out structure, and ρ denotes density of metal material of the suspension pole plate.

Voltage applied to the inner and outer pole plates is output by an output circuit as a measurement result. Each set of circuit corresponds to a set of Sandwich structure (i.e., each of the corresponding inner and outer pole plates), a quadrangle and an isosceles triangle are each connected to a set of circuit. The whole device needs eight circuits to operate at the same time. The output forms eight space vectors, with vector, curl and external force being totally opposite, so as to achieve the effect of electrostatic levitation and to form functions of measuring a space omnidirectional vector, a curl and a divergence. The inner hollowed-out base and the outer hollowed-out base are of a connected structure manufactured by insulating materials, and metal pole plates are electrically insulated from each other. The inner hollowed-out base and the outer hollowed-out base are each provided in advance a guide protrusion structure that protrudes outwards from the hollowed-out portion, the guide protrusion structure is provided with a leadout circuit electrically connected to each pole plate. Eight pairs of pole plates (which are divided into quadrilateral pole plates and isosceles triangle pole plates) of the omnidirectional vector electrostatic levitation geophone correspond totally to eight circuits and sixteen leadout electrodes.

In this way, the electrostatic levitation formula: $U^2=0.5 h\rho d^2(g+a)/\varepsilon$ becomes a space force balance vector formula. Wherein $U^2$ denotes an output vector set; $(g+a)$ denotes an input vector set; $0.5 h\rho d^2/\varepsilon$ denotes a response function, which means not only sensitivity but also fidelity. If the device is successfully manufactured, h, ρ, d, ε are constants, which means that the fidelity is very good; the electrostatic levitation condition satisfies $$0.5\ h\rho d^2/\varepsilon \gg \frac{m}{k},$$

and sensitivity is also far larger than that of a spring support structure.

Figure 15:
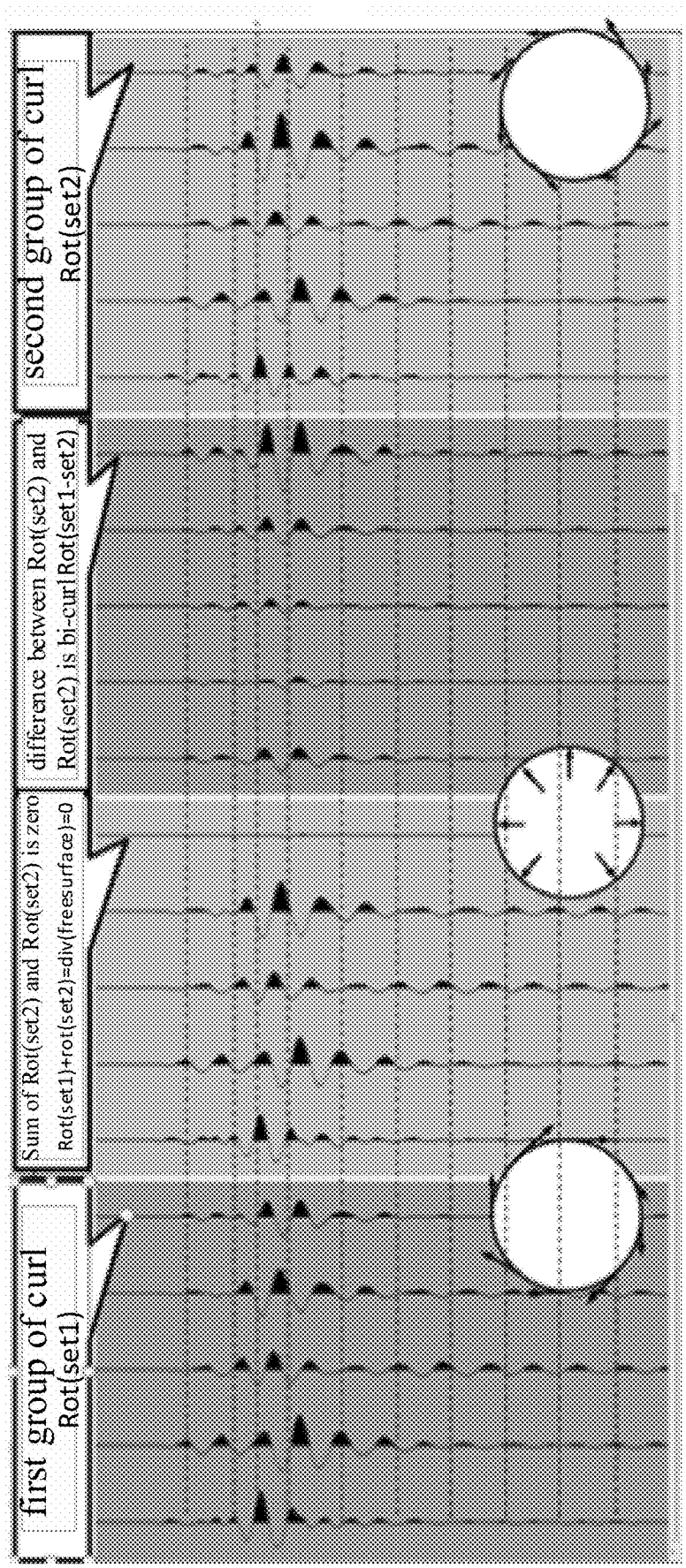
FIG. 15 is a schematic diagram of actually measured output of an omnidirectional vector electrostatic levitation geophone based on an embodiment of the invention.

FIG. 15 is a schematic diagram of actually measured output of an omnidirectional vector electrostatic levitation geophone based on an embodiment of the invention. As shown in FIG. 15, four output results of the above first circuit correspond to a first group of curl as shown in FIG. 15, and four output results of the above second circuit correspond to a second group of curl as shown in FIG. 15. Sum of the first group of curl and the second group of curl is zero, and difference between the first group of curl and the second group of curl is bi-curl. Vector direction of the omnidirectional vector electrostatic levitation geophone is determined by One-spin-to-Two right-hand rule, a total curl vector direction can be calculated by vector operation. A vibration line vector can be obtained by calculating redundant vectors, and is equal to a vibration line vector calculated by a traditional three-component wave detector. By applying the method of solving a shear wave vibration line vector by curl, a pure shear wave line vector can be solved, and a pure pressure wave vibration line vector can be obtained by reducing the pure shear wave line vector from total vibration line vector.

Specific structure of the omnidirectional vector electrostatic levitation geophone has been described in detail in the above, in practical application process, in order to place the omnidirectional vector electrostatic levitation geophone conveniently, a vertex right below the main triangular surface of the outer hollowed-out base can be connected to a conical tail cone with a conical point facing vertically downwards, so as to be fixed on the ground easily. The omnidirectional vector electrostatic levitation geophone can further be provided with a spherical shell divided into an upper-half spherical shell and a lower-half spherical shell, the outer hollowed-out base, the regular tetrahedron hollowed-out structure and the inner hollowed-out base are placed inside the spherical shell, the lower-half spherical shell is provided with a tail cone hole at the bottom thereof, and the tail cone passes through the tail cone hole of the lower-half spherical shell. Such that the spherical shell can be inserted and connected onto the ground, to stabilize the omnidirectional vector electrostatic levitation geophone.

In consideration of fixation of the upper-half spherical shell and the lower-half spherical shell, the embodiment provides a preferable embodiment, namely: the upper-half spherical shell and the lower-half spherical shell are respectively provided on edges thereof with projections that are matched with each other, the projections of the upper-half spherical shell and the lower-half spherical shell are fixed by a fixing assembly, for example, being fixed by a screw and a screw hole. Thus stability of the omnidirectional vector electrostatic levitation geophone in practical operation process can be ensured.

For a signal output line of the circuit of the omnidirectional vector electrostatic levitation geophone, a signal line hole can be provided on the spherical shell such that the signal output line of the circuit (i.e., the above-described first circuit and second circuit) passes through the signal line hole, so as to be convenient for the signal output line to be output to outside of the shell to effectively obtain the data.

In order to avoid water flooding into the omnidirectional vector electrostatic levitation geophone to affect use, waterproof may be sealed at the joint gap between the upper-half spherical shell and the lower-half spherical shell of the spherical shell, the tail cone hole and the signal line hole, for example, silica gel or rubber materials may be selected for sealing, so as to improve sealing performance of the omnidirectional vector electrostatic levitation geophone.

For regular tetrahedron shape of the omnidirectional vector electrostatic levitation geophone, each surface can be a plane or can be any curved surface, which is not limited in the invention.

The manufacturing method of the omnidirectional vector electrostatic levitation geophone is as below:

by a 3D printing method, printing tantalum powder, porcelain clay powder, acid-proof metal powder and non-resistant material powder into an embryo based on a computer stereoscopic drawing that is designed according to accurate parameters, after high temperature molding, corroding the non-resistant material by using acid liquor that can react with tantalum to generate tantalum pentoxide to hollow-out and mold the non-resistant material, so as to form an insulation layer. Whether or not the omnidirectional vector electrostatic levitation geophone is disposed to be vacuum depends on cost and demand. The circuit in the omnidirectional vector electrostatic levitation geophone can be packaged separately.

Based on the omnidirectional vector electrostatic levitation geophone provided by the invention, at least the following effects can be achieved:

1. Electronic technology level of the omnidirectional vector electrostatic levitation geophone far exceeds seismic demand, influence on moving mass blocks can be reduced to very little when in deep negative feedback, and the electrostatic force is at a DC extremely low frequency, bandwidth is likely to reach zero to hundreds of or even thousands of Hz. A frequency curve is straight on a wide frequency band, both of sensitivity and fidelity are greatly higher than of an omnidirectional vector wave detector manufactured by an electromagnetic type and existing MEMS type cells.

2. Output of the omnidirectional vector electrostatic levitation geophone when in a stable state is gravity, which can be used for gravity prospecting, dip computation or the like.

3. Circuit principle of the omnidirectional vector electrostatic levitation geophone is high frequency small capacitance measurement, a strong negative feedback electrostatic force controls distance between the upper and lower pole plates to be equal, and a space electrostatic force of the regular tetrahedron negatively feeds back to realize electrostatic balance.

The omnidirectional vector electrostatic levitation geophone may be applied in the following aspects: land based artificial seismic exploration, natural seismic detection, gravitational detection, motion attitude measurement or the like. The omnidirectional vector electrostatic levitation geophone provided by the invention can detect curl of seismic wave and can obtain vibration direction and real amplitude of the wave field, can decompose out pure pressure and shear waves, and thus can obtain abundant seismic wave information never seen before, thereby laying a new data base for exploration and research of earth science.

Application of the omnidirectional vector electrostatic levitation geophone in seismic wave detection is a completely new idea of seismic wave detection method, which can develop a completely new idea of multi-dimensional, processing and interpretation method, and form a completely new series of seismic exploration technologies, not just a new technology of improving signal-to-noise ratio, sensitivity and fidelity. Further research and application of the technology will discover more technical characteristics, and belongs to a completely new technical field of invention, discovery and development. The indexes measured by using the omnidirectional vector electrostatic levitation geophone can be greatly improved, which can be applied in a more sophisticated field, for example, high sensitivity design of an ultra low frequency broadband can extend to curl and divergence property detection of gravitational wave, micro-acceleration and micro-curl measurement, motion attitude control or other similar fields.

In the description, reference terms "one embodiment", "some embodiments", "example", "specific example" or "some examples" are used to mean that specific features, structures, materials or characteristics described by combining the embodiment or example are included in at least one embodiment or example of the invention. In the description, exemplary expression of the above terms does not necessarily refer to the same embodiment or example. Moreover, the described specific features, structures, materials or characteristics may be combined in a suitable manner in any one or more of the embodiments or examples.

The purpose, technical solution and beneficial effect of the invention have been further described in detail in the above specific embodiments, it should be understood that the above contents are merely specific embodiments of the invention and are not for limiting protection scope of the invention, and any modifications, equivalent replacements, improvements etc. within the spirit and principle of the present invention shall be included within the protection scope of the present invention.

The invention claimed is:

1. An omnidirectional vector electrostatic levitation geophone, comprising: a regular tetrahedron hollowed-out structure, and an inner hollowed-out base and an outer hollowed-out base that are provided inside and outside the regular tetrahedron hollowed-out structure and at equal distance from the regular tetrahedron hollowed-out structure, and have the same structure as and different size from the regular tetrahedron hollowed-out structure;

the regular tetrahedron hollowed-out structure has a solid part and a hollowed-out part of each surface thereof, the solid part is a quadrangle divided from angular bisectors of two angles on each surface and an isosceles triangle that abuts the solid part by a surface central point, and the hollowed-out part is two triangles that are divided from the angular bisectors of the two angles and abut each other by a surface central point;

an outer surface of each surface of the inner hollowed-out base is plated with a metal layer; wherein size of the metal layer is smaller than that of the quadrangle and the isosceles triangle of the inner hollowed-out base, and the metal layer on the quadrangle of the inner hollowed-out base and the metal layer on the isosceles triangle do not contact each other;

an inner surface of each surface of the outer hollowed-out base is plated with a metal layer; wherein size of the metal layer is smaller than that of the quadrangle and the isosceles triangle of the outer hollowed-out base, and the metal layer on the quadrangle of the outer hollowed-out base and the metal layer on the isosceles triangle do not contact each other.

2. The omnidirectional vector electrostatic levitation geophone according to claim 1, wherein the regular tetrahedron hollowed-out structure includes a main triangular surface;

one of the angles of the main triangular surface is defined as a first vertex angle of the regular tetrahedron hollowed-out structure, the first vertex angle is an angle of the quadrangle of the solid part of the main triangular surface;

the other surface on which a bottom edge opposite to the first vertex angle is defined as a first side surface of the regular tetrahedron hollowed-out structure, a midpoint of the bottom edge opposite to the first vertex angle slides in an anti-clockwise direction on the main triangular surface and meets an angle on the first side surface that is defined as a second vertex angle, and the second vertex angle is an angle of the quadrangle of the solid part of the first side surface;

the other surface on which a bottom edge opposite to the second vertex angle is defined as a second side surface of the regular tetrahedron hollowed-out structure, a midpoint of the bottom edge opposite to the second vertex angle slides in a clockwise direction on the first side surface and meets an angle on the second side surface that is defined as a third vertex angle, and the third vertex angle is an angle of the quadrangle of the solid part of the second side surface;

the other surface on which a bottom edge opposite to the third vertex angle is defined as a third side surface of the regular tetrahedron hollowed-out structure, a midpoint of the bottom edge opposite to the third vertex angle slides in an anti-clockwise direction on the second side surface and meets an angle on the third side surface that is defined as a fourth vertex angle, and the fourth vertex angle is an angle of the quadrangle of the solid part of the third side surface;

or, the first vertex angle, the second vertex angle, the third vertex angle and the fourth vertex angle correspond to a first vertex, a second vertex, a third vertex and a fourth vertex of the regular tetrahedron hollowed-out structure respectively;

the first vertex angle is an angle of the quadrangle of the solid part of the main triangular surface; the third vertex is at an angle of the first side surface, is an angle of the quadrangle of the solid part of the first side surface; the fourth vertex is at an angle of the second side surface, is an angle of the quadrangle of the solid part of the second side surface; the second vertex is at an angle of the third side surface, is an angle of the quadrangle of the solid part of the third side surface.

3. The omnidirectional vector electrostatic levitation geophone according to claim 1, wherein,
the regular tetrahedron hollowed-out structure is of a metal material;
the inner hollowed-out base and the outer hollowed-out base are of insulation materials; a first circuit is connected between the metal layers on the quadrangle on surfaces that are symmetric on the outer hollowed-out base and the inner hollowed-out base; a second circuit is connected between the metal layers on the isosceles triangles on surfaces that are symmetric on the outer hollowed-out base and the inner hollowed-out base.

4. The omnidirectional vector electrostatic levitation geophone according to claim 3, wherein,
surfaces of the regular tetrahedron hollowed-out structure, surfaces of the metal layers on the inner hollowed-out base and the outer hollowed-out base are all oxidized to form a layer of insulating film.

5. The omnidirectional vector electrostatic levitation geophone according to claim 3, wherein a vertex right below the main triangular surface of the outer hollowed-out base is connected to a conical tail cone with a conical point facing vertically downwards.

6. The omnidirectional vector electrostatic levitation geophone according to claim 5, wherein the omnidirectional vector electrostatic levitation geophone further comprises: a spherical shell divided into an upper-half spherical shell and a lower-half spherical shell, the outer hollowed-out base, the regular tetrahedron hollowed-out structure and the inner hollowed-out base are placed inside the spherical shell, the lower-half spherical shell is provided with a tail cone hole at the bottom thereof, and the tail cone passes through the tail cone hole of the lower-half spherical shell.

7. The omnidirectional vector electrostatic levitation geophone according to claim 6, wherein, the upper-half spherical shell and the lower-half spherical shell are respectively provided on edges thereof with projections that are matched with each other, the projections of the upper-half spherical shell and the lower-half spherical shell are fixed by a fixing assembly.

8. The omnidirectional vector electrostatic levitation geophone according to claim 6, wherein, a signal line hole can be provided on the spherical shell, signal output lines of the first circuit and the second circuit pass through the signal line hole.

9. The omnidirectional vector electrostatic levitation geophone according to claim 8, wherein, waterproof may be sealed by a silicone or rubber material at the joint gap between the upper-half spherical shell and the lower-half spherical shell of the spherical shell, the tail cone hole and the signal line hole.

10. The omnidirectional vector electrostatic levitation geophone according to any one of claims 1 to 9, wherein, each surface of the outer hollowed-out base, the regular tetrahedron hollowed-out structure and the inner hollowed-out base is any curved surface or a plane.

\* \* \* \* \*